(12) United States Patent
Dempster et al.

(10) Patent No.: US 11,649,982 B2
(45) Date of Patent: *May 16, 2023

(54) SYSTEMS AND METHODS FOR USING A SMART VALVE TO CONTROL CONDITIONED AIR

(71) Applicant: BELIMO HOLDING AG, Hinwil (CH)

(72) Inventors: Ian Robert Dempster, Seattle, WA (US); Benjamin Paul Erpelding, San Diego, CA (US); Thomas Bennett Hartman, Georgetown, TX (US); Chelsey Ann MacNeill, Barton City, MI (US)

(73) Assignee: BELIMO HOLDING AG, Hinwil (CH)

( * ) Notice: Subject to any disclaimer, the term of this patent is extended or adjusted under 35 U.S.C. 154(b) by 246 days.

This patent is subject to a terminal disclaimer.

(21) Appl. No.: 16/989,085

(22) Filed: Aug. 10, 2020

(65) Prior Publication Data

US 2020/0370766 A1   Nov. 26, 2020

Related U.S. Application Data

(60) Continuation of application No. 16/135,782, filed on Sep. 19, 2018, now Pat. No. 10,739,021, which is a
(Continued)

(51) Int. Cl.
| | |
|---|---|
| *F24F 11/84* | (2018.01) |
| *F24F 3/08* | (2006.01) |
| *F24F 3/044* | (2006.01) |
| *F24H 3/08* | (2022.01) |
| *F24H 9/20* | (2022.01) |
| *F24F 11/62* | (2018.01) |
| *F24F 11/83* | (2018.01) |
| *F24F 11/30* | (2018.01) |

(Continued)

(52) U.S. Cl.
CPC .............. *F24F 11/84* (2018.01); *F24F 3/044* (2013.01); *F24F 3/08* (2013.01); *F24F 11/30* (2018.01); *F24F 11/58* (2018.01); *F24F 11/62* (2018.01); *F24F 11/63* (2018.01); *F24F 11/83* (2018.01); *F24H 3/08* (2013.01); *F24H 9/2064* (2013.01); *F24F 11/56* (2018.01); *F24F 2110/10* (2018.01); *F24F 2140/20* (2018.01); *Y02B 30/70* (2013.01)

(58) Field of Classification Search
CPC .... F24F 11/84; F24F 3/044; F24F 3/08; F24F 11/30; F24F 11/58; F24F 11/62; F24F 11/63; F24F 11/83; F24F 11/56; F24F 2110/10; F24F 2140/20; F24H 3/08; F24H 9/2064; Y02B 30/70
See application file for complete search history.

(56) References Cited

U.S. PATENT DOCUMENTS

| 3,125,710 A | 3/1964 | Kaplan |
| 3,979,922 A | 9/1976 | Shavit |
(Continued)

*Primary Examiner* — Ljiljana V. Ciric
(74) *Attorney, Agent, or Firm* — Sughrue Mion, PLLC

(57) ABSTRACT

A method for controlling an air handler includes providing a temperature setpoint to a smart valve in fluid communication with one or more coils of the air handler, providing to the smart valve an air temperature of air conditioned by the air handler, and modulating a valve position of the smart valve using the temperature setpoint, and the air temperature.

10 Claims, 7 Drawing Sheets

Related U.S. Application Data division of application No. 14/108,725, filed on Dec. 17, 2013, now Pat. No. 10,119,711.

(51) Int. Cl.
*F24F 110/10* (2018.01)
*F24F 140/20* (2018.01)
*F24F 11/56* (2018.01)
*F24F 11/58* (2018.01)
*F24F 11/63* (2018.01)

(56) References Cited

U.S. PATENT DOCUMENTS

| | | |
|---|---|---|
| 1,186,564 A | 2/1980 | Myers |
| 1,362,026 A | 12/1982 | Milier |
| 1,382,284 A | 5/1983 | Dressel et al. |
| 1,389,706 A | 6/1983 | Gomola et al. |
| 1,457,357 A | 7/1984 | Van Arnhem |
| 1,497,031 A | 1/1985 | Froehling et al. |
| 1,543,796 A | 10/1985 | Han et al. |
| 1,974,664 A | 12/1990 | Glennon et al. |
| 5,276,630 A | 1/1994 | Baldwin et al. |
| 5,323,961 A | 6/1994 | Hurmi |
| 5,333,677 A | 8/1994 | Molivadas |
| 5,431,182 A | 7/1995 | Brown |
| 5,447,037 A | 9/1995 | Bishop et al. |
| 5,467,919 A | 11/1995 | Tamblyn |
| 5,501,265 A | 3/1996 | Bujak, Jr. |
| 5,915,473 A | 6/1999 | Ganesh et al. |
| 5,950,443 A | 9/1999 | Meyer et al. |
| 3,064,310 A | 5/2000 | Busak et al. |
| 6,607,140 B1 | 8/2003 | Hartman |
| 7,434,413 B2 | 10/2008 | Wruck |
| 7,496,472 B2 | 2/2009 | Seem |
| 7,758,407 B2 | 7/2010 | Ahmed |
| 7,847,681 B2 | 12/2010 | Singhal et al. |
| 7,890,215 B2 | 2/2011 | Duncan |
| 7,904,186 B2 | 3/2011 | Mairs et al. |
| 7,963,454 B2 | 6/2011 | Sullivan et al. |
| 7,966,104 B2 | 6/2011 | Srivastava et al. |
| 8,027,742 B2 | 9/2011 | Seem et al. |
| 8,316,926 B2 | 11/2012 | Cheng et al. |
| 8,516,016 B2 | 8/2013 | Park et al. |
| 8,651,391 B2 | 2/2014 | Patch |
| 8,694,166 B2 | 4/2014 | Quirk |
| 8,718,707 B2 | 5/2014 | Crawford et al. |
| 8,725,300 B2 | 5/2014 | Desrochers |
| 8,755,943 B2 | 6/2014 | Wenzel |
| 8,897,921 B2 | 11/2014 | Dempster et al. |
| 9,152,153 B2 | 10/2015 | Sullivan et al. |
| 9,217,592 B2 | 12/2015 | Turney et al. |
| 9,285,134 B2 | 3/2016 | Bray et al. |
| 9,325,573 B2 | 4/2016 | Swainston |
| 9,354,968 B2 | 5/2016 | Wenzel et al. |
| 9,367,825 B2 | 6/2016 | Steven et al. |
| 9,390,388 B2 | 7/2016 | Drees et al. |
| 9,400,493 B2 | 7/2016 | Brun et al. |
| 9,411,327 B2 | 8/2016 | Park |
| 9,429,927 B2 | 8/2016 | Mesler et al. |
| 9,471,722 B2 | 10/2016 | Drees et al. |
| 9,494,334 B2 | 11/2016 | Sipe et al. |
| 9,518,748 B2 | 12/2016 | Holtz et al. |
| 9,519,297 B1 | 12/2016 | Virskus |
| 9,657,946 B2 | 5/2017 | Young et al. |
| 10,465,925 B2 * | 11/2019 | Dempster ............ F24F 3/08 |
| 10,739,021 B2 * | 8/2020 | Dempster ............ F24H 3/08 |
| 11,300,308 B2 * | 4/2022 | Gillette ............ G05D 23/1905 |
| 11,306,927 B2 * | 4/2022 | Dempster ............ F24F 11/62 |
| 11,473,797 B2 * | 10/2022 | Sinha ............ F24F 11/65 |
| 2004/0000399 A1 | 1/2004 | Gavula |
| 2006/0118745 A1 | 6/2006 | Tuin et al. |
| 2006/0249589 A1 | 11/2006 | Karamanos |
| 2009/0035121 A1 | 2/2009 | Watson et al. |
| 2010/0106328 A1 | 4/2010 | Li et al. |
| 2010/0324741 A1 | 12/2010 | House et al. |
| 2011/0178977 A1 | 7/2011 | Drees |
| 2013/0091883 A1 | 4/2013 | Perez et al. |
| 2014/0109605 A1 | 4/2014 | Qu et al. |
| 2014/0130878 A1 | 5/2014 | Marinez |
| 2014/0262133 A1 | 9/2014 | Brown et al. |
| 2014/0277764 A1 | 9/2014 | Burt |
| 2014/0326002 A1 | 11/2014 | Sunderland et al. |
| 2014/0372164 A1 | 12/2014 | Egan et al. |
| 2015/0045982 A1 | 2/2015 | Egan et al. |
| 2015/0168000 A1 | 6/2015 | Dempster et al. |
| 2015/0168041 A1 | 6/2015 | Havard, Jr. et al. |
| 2015/0176718 A1 | 6/2015 | Zhuo |
| 2015/0204595 A1 | 7/2015 | Sunderland et al. |
| 2015/0233597 A1 | 8/2015 | Dempster et al. |
| 2015/0293505 A1 | 10/2015 | Gonzalez |
| 2016/0077530 A1 | 3/2016 | Moran et al. |
| 2016/0327293 A1 | 11/2016 | Grabowski et al. |
| 2016/0330285 A1 | 11/2016 | Brophy et al. |
| 2016/0377306 A1 | 12/2016 | Drees et al. |
| 2017/0124842 A1 | 5/2017 | Sinha et al. |

* cited by examiner

SYSTEMS AND METHODS FOR USING A SMART VALVE TO CONTROL CONDITIONED AIR

PRIORITY CLAIM

This is a continuation application of U.S. application Ser. No. 16/135,782, filed Sep. 19, 2018, which is a divisional application of U.S. application Ser. No. 14/108,725, filed Dec. 17, 2013, now U.S. Pat. No. 10,119,711, issued Nov. 6, 2018, the entire contents of each of which are hereby incorporated by reference in their entireties.

FIELD OF THE INVENTION

The present invention generally relates to systems and methods for selectively modulating smart valves to control conditioned air in an air handler unit (AHU) through an automation system or through direct programming of one or more smart valves within the AHU to meter the amount of water that flows through a coil in AHU.

BACKGROUND

Air handler units (AHUs) are commonly employed to condition and circulate air as part of a heating, ventilating, and air-conditioning (HVAC) system for buildings, and large buildings in particular. AHUs may provide heating, cooling, or both to change the supply air temperature, humidity level, or both depending on geographic location and current environmental factors. Such conditioning is provided by coil(s) (e.g., heat exchanger coils or cooling coils) located to interact with the AHU's air flow. AHUs may take the form of terminal units (also called fan coil units), packaged units or rooftop units, but will be referred to herein as AHUs for purpose of brevity.

Conditioning of the air flow typically employs the use of hot water or steam for heating and cool or chilled water for cooling. Coils for transferring heat may take the form of metallic tubes combined with metallic fins to encourage heat transfer; whereas cooling coils may employ eliminator plates and condensate pans to remove and drain condensation. In large buildings or building complexes, for example, central boiler and chiller plants are generally employed to generate hot water/steam and cool water, respectively. The water is circulated to and through the building in dedicated conduit.

In more modern HVAC systems, the AHUs may include self-regulating (also referred to as self-ranging, self-balancing or smart) valves that modulate the flow of the water through the coils inside the AHUs. These conventional smart valves typically communicate with water temperature sensors that monitor the temperature of the cold/hot water return and/or supply flows. When the water temperature sensors monitor both the return and supply flows, the smart valve may be configured to maintain a minimum temperature difference between the supply and return flows in addition to controlling the temperature of the air being discharged from the coil. In addition, the AHUs include fans or blowers that move the air flow over and/or through the coils to obtain a desired downstream or "off coil" air temperature and a desired airflow volume. The downstream air flow may be directed toward a desired space (e.g., a room or hallway) through air ducts and/or vents.

The control of the AHU, generally, and the control of at least some of the equipment comprising the AHU may be accomplished with an automation system such as, but not limited to a unit or building automation system (hereinafter generally referred to as a building automation system or BAS). Controlling the downstream air temperature, in particular, may be based on comfort requirements or desires, equipment capabilities, process requirements, efficiency goals, or some combination thereof.

BRIEF SUMMARY OF THE INVENTION

The present invention is generally directed toward systems and methods for selectively modulating smart valves of an air handler unit (AHU) in communication with a building automation system (BAS) or through direct programming of one or more other smart valves within the AHU to meter the amount of water that flows through a coil in an AHU. In one embodiment, the BAS transmits a temperature setpoint signal to the smart valve and allows the smart valve to control its valve position without additional input from the BAS. In another embodiment, the AHU includes a master smart valve and a second valve. The BAS provides the temperature setpoint signal to the master smart valve, which in turn provides another temperature setpoint signal to the second valve. The second valve may take the form of another smart valve or a slave non-smart valve.

In one aspect of the present invention, an air unit includes a coil located in an air stream of the air unit, the air stream having an air flow direction; an air temperature sensor located in the air stream of the air unit and further located downstream, relative to the air flow direction, of the coil; and a smart valve in fluid communication with the coil and in electronic communication with the air temperature sensor, the smart valve operable to control an amount of water flow through the coil. In one embodiment, the smart valve receives a temperature setpoint signal and the smart valve is programmed to modulate a valve position of a smart valve actuator based on the temperature setpoint signal and based on a signal from the air temperature sensor.

In another aspect of the invention, an air handler unit in communication with an automation system, such as a building automation system includes a coil located in an air stream of the air handler unit, the air stream having an air flow direction, an air temperature sensor located in the air stream of the air handler unit and further located downstream, relative to the air flow direction, of the coil; and a smart valve in signal communication with the building automation system, the smart valve in fluid communication with the coil and in electronic communication with the air temperature sensor, the smart valve operable to control an amount of water flow through the coil. In one embodiment, the smart valve receives a temperature setpoint signal and the smart valve is programmed to modulate a valve position of a smart valve actuator based on the temperature setpoint signal and based on a signal from the air temperature sensor.

In yet another aspect of the invention, a method for controlling an air handler unit includes the steps of (1) providing a temperature setpoint to a smart valve based on a desired temperature for a space served by the air handler unit, the smart valve in fluid communication with at least one coil located within the air handler unit; (2) providing a water temperature to the smart valve for water flowing into or out of the coil; (3) providing an air temperature to the smart valve, the air temperature corresponding to an air temperature of an air flow conditioned by the air handler unit; and (4) modulating a valve position of the smart valve based on the temperature setpoint, the water temperature, and the air temperature.

BRIEF DESCRIPTION OF THE DRAWINGS

Preferred and alternative embodiments of the present invention are described in detail below with reference to the following drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with HVAC systems; automation systems (e.g., building automation systems referred to as BASs); air handler units (AHUs) such as, but not limited to terminal units (also called fan coil units), packaged units or rooftop units, and various equipment used in AHUs such as, but not limited to, controllable valves, heating and cooling coils, various types of sensors; controllers and processors; communication networks; various computing and/or processing systems; various HVAC and/or AHU system operational parameters and set points; and methods of operating any of the above with respect to one or more buildings have not necessarily been shown or described in detail to avoid unnecessarily obscuring descriptions of the embodiments of the invention.

Self-regulating or smart valves are typically employed to maintain a specific, but often adjustable, air temperature for air being moved past the coils. In many applications, the AHUs, and in particular the coils, may be unable to meet an air temperature set point, may be susceptible to time of unstable control, may provide insufficient heating or cooling or at an insufficient rate, may be susceptible to potential freezing conditions, simultaneous heating and cooling (i.e., fighting). Any one of the foregoing or some combination thereof may result in undesired energy inefficiencies.

Figure 1:
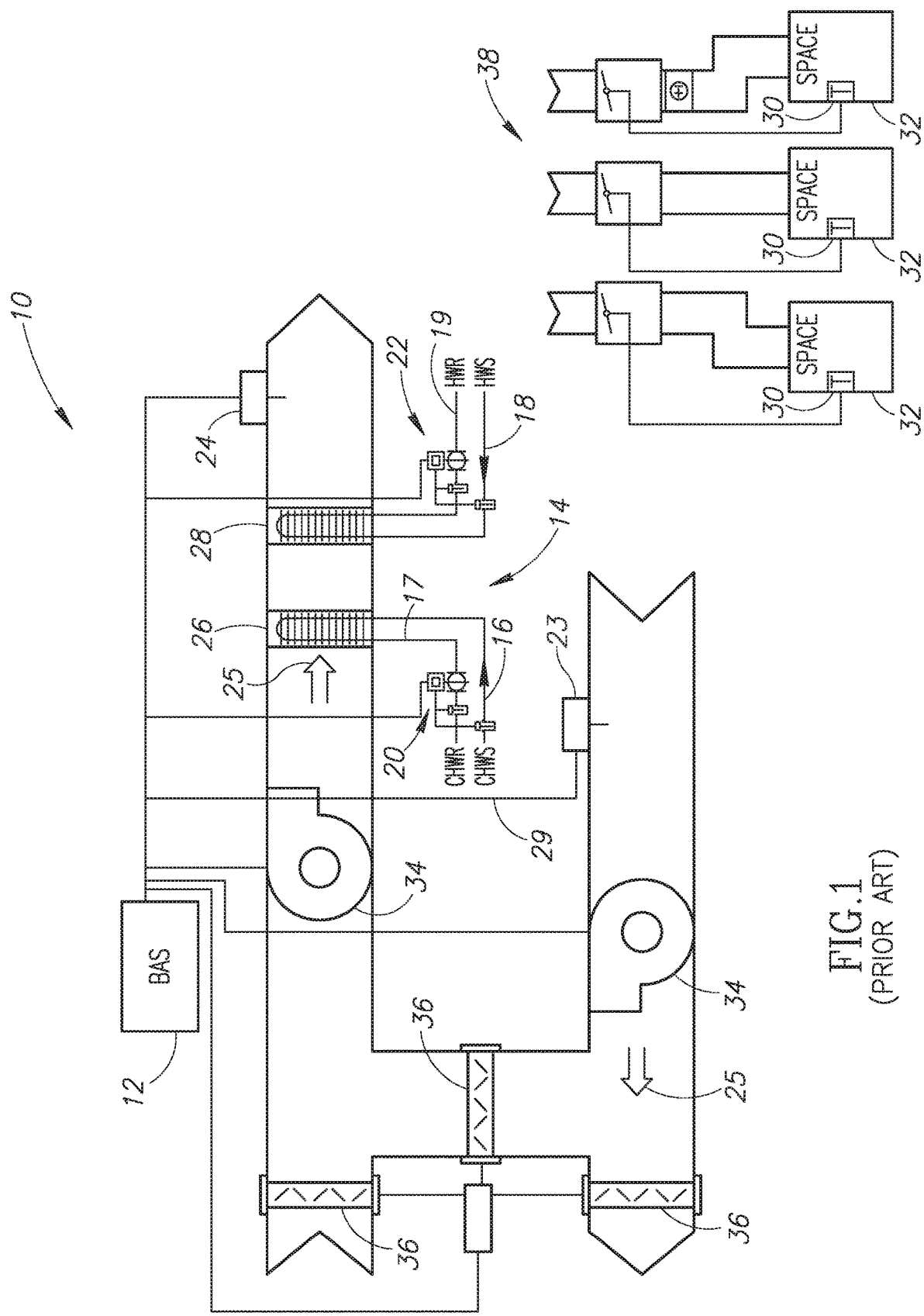
FIG. 1 is a schematic system diagram of a prior-art air handling unit.

In conventional AHU and HVAC systems, such as the prior-art AHU system 10 shown in FIG. 1, a BAS controller 12, which may be located internally within or externally from the AHU, communicates with the AHU system 10, and in particular may communicate directly or indirectly with various components of the AHU system 10. The AHU system 10 typically includes two water loops 16, 18 that receive heated or cooled water, respectively, (or sometimes heated and cooled simultaneously for humidity control purposes) from a coldwater supply line 16 and a hot water supply line 18, respectively. The flow of the chilled water through the cooling coil 26 and back to the chilled water return line 17 is controlled (e.g., modulated) by a smart valve 20. Similarly, the flow of heating water through the heating coil 28 and back to the hot water return line 19 is controlled by a smart valve 22. Each smart valve 20, 22 may communicate bi-directionally with and provide information to and from the BAS controller 12. One or more air temperature sensors 23, 24 may be positioned within the AHU system 10 in which air direction is indicated by arrows 25.

The air temperature sensors 23, 24 are in direct electronic communication with the BAS 12 as indicated by communication lines 27, 29, respectively. The BAS 12 then controls or modulates the smart valves 20, 22. This control or modulation is accomplished with PI or PID control techniques (P=proportional, I=integral, and D=derivative). With a PI or PID control technique, a comparison is made between a current air temperature and a desired temperature, in which the latter is also referred to as a "setpoint". The comparison is used to develop an error signal. A value of the error signal is determined by a calculation that includes summing the proportional, integral, and derivative gains (each gain is individually adjustable and can be set to zero in which case that element is not part of the error signal). Conventionally, the combination of the PI or PID gain calculations/summations and the air temperature sensors in direct electronic communication with the BAS 12 are the only input needed to develop the error signal. Because the characteristics of each valve 20, 22 and coil 26, 28 are different, the PI or PID gains must be programmed individually for each valve 20, 22. Achieving good control and stable operation takes a certain degree of expertise and experience and considerable time for set up and tuning. By way of example, tuning the BAS 12 to control the valves 20, 22 for one range of conditions does not ensure the valves 20, 22 will operate with sufficient stability and accuracy under all conditions because the PI or PID calculations require a continuously proportional relationship between the coil capacity and valve actuation. Certain design rules of thumb are employed to achieve this proportional relationship, but it cannot ever be completely achieved, and the demands of operational flexibility and energy efficiency make it unlikely to be even marginally achieved in conventional AHUs. Consequently, a BAS 12 that is tuned to operate the valves 20, 22 efficiently under a particular set of circumstances (e.g., a specific season), will most likely operate unsatisfactorily under other circumstances or during different seasons.

Still referring to FIG. 1, the upper air temperature sensor 24 is located in the AHU system 10 downstream of the cooling coil 26 and the heating coil 28, respectively. Another air temperature sensor 30 may be located in a space 32 that receives conditioned air from the AHU system 10. The air temperature sensor 30 is also in direct electronic communication with the BAS 12 as indicated by signal 31. The various air temperature sensors 23, 24, 30 are typically employed by the BAS 12 to evaluate the air temperature moving through the AHU system 10 and the air temperature in the space 32 in order to maintain a desired temperature condition in the space 32 and to determine a volume of airflow required through the AHU system 10. The sensors 23, 24, 30 may communicate directly or indirectly with the BAS controller 12.

One or more fans or blowers 34 are located in the AHU system 10 to move air through or within the AHU system 10 and specifically to move air past the coils 26, 28. The AHU system 10 may further include air mixing dampers 36 to regulate the mixing of outside air and return air into the AHU system 10 for ventilation purposes or to use outside air for cooling when conditions permit. Temperature controlled variable-air-volume (VAV) boxes 38 may be connected to the AHU system 10 and employed to regulate the flow of air from the AHU system 10 into one or more individual spaces 32 served by the AHU system 10.

Smart valves, such as the ones described in U.S. Pat. No. 6,607,140 entitled "Method for Precise Electric Actuator Control with Reduced Repositioning" and in U.S. Pat. No. 6,352,106 entitled "High-Efficiency Pumping and Distribution System Incorporating a Self-Balancing, Modulating Control Valve" may be capable of maintaining or controlling the heating and/or cooling of water in an AHU system with control logic and commands supplied by the BAS. The BAS may utilize a differential water temperature, a measured flow rate and/or other system parameters to determine respective valve positions (e.g., the valve actuators) for the smart valves.

Figure 2:
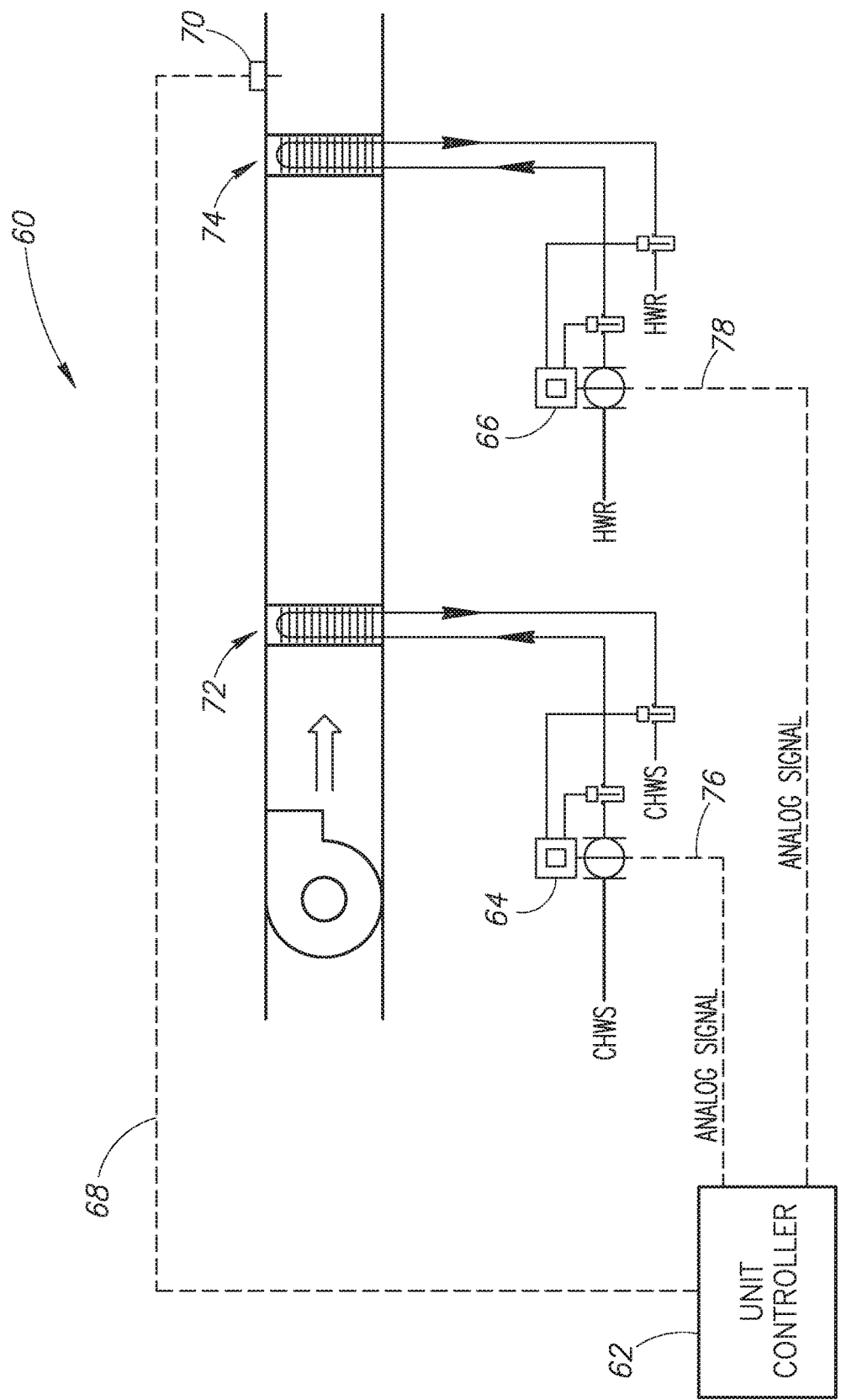
FIG. 2 is schematic system diagram of a fan coil unit.

FIG. 2 shows a fan coil unit 60 having a unit controller 62 that directly controls the respective valve positions of smart valves 64, 66 with an input signal 68 from an air temperature sensor 70 located downstream of the coils 72, 74. Typically, the valve positions are calibrated using analog position command signals 76 and 78 that may be decoded to a 0-100 percentage open (where 0%=fully closed and 100%=fully open) valve position of the valve actuator in response to an error between an actual supply air temperature and a required or desired supply air temperature. When the unit controller 62 is initially programmed, a required step in setting up the control logic is for a controls programmer to adjust a proportional-integral (PI) or a proportional-integral-derivative (PID) controller for the valves 64, 66 so fan coil unit 60 will maintain air temperature in a stable manner. Unfortunately, inexperienced or hurried programmers may, and often do, miss this required step. Alternatively or additionally, or a lack of linearity between the input and output of the valve control loops frequently results in a lack of stable control of the air temperature and variable, but inconsistent, control of an amount of energy loss by the fan coil unit 60. Ultimately, the rooms or spaces that are meant to receive conditioned air from the fan coil unit 60 may be either too cool, too hot or have temperature swings regardless of a temperature setting on a thermostat or a temperature sensor within the room or space.

In one embodiment of the present invention, an air temperature sensor is incorporated into a smart valve to provide a means of multivariable control, also referred to as relational control, for modulating the smart valve with greater precision, less setup, and virtually no tuning. Along with current and recent history of valve positioning, the smart valve directly receives temperature values of the water leaving and entering a heating and/or a cooling coil. With this information the smart valve may calculate how much valve movement is required to meet a change in capacity, and therefore temperature change, that may be needed to meet a current air temperature setpoint under a variety of operating circumstances or conditions. The multivariable control permits the valve modulations to be calculated with substantial precision on a real time basis.

The multivariable control may be accomplished by an automation system such as, but not limited to a BAS, that receives signals directly from the smart valves identifying a current valve position and a current water temperature. However, maintaining control within the BAS could produce latency or lag due to a time delay associated with acquiring these values from the smart valve, transmitting these values to the BAS, processing these values, and providing command instructions back to the smart valve. Configuring a general purpose BAS to perform such multivariable control is typically expensive to implement. Consequently, one or more embodiments of the present invention may advantageously provide a more cost efficient and effective means of reducing the cost of implementing valve control while also improving the accuracy and stability of that control.

Figure 3:
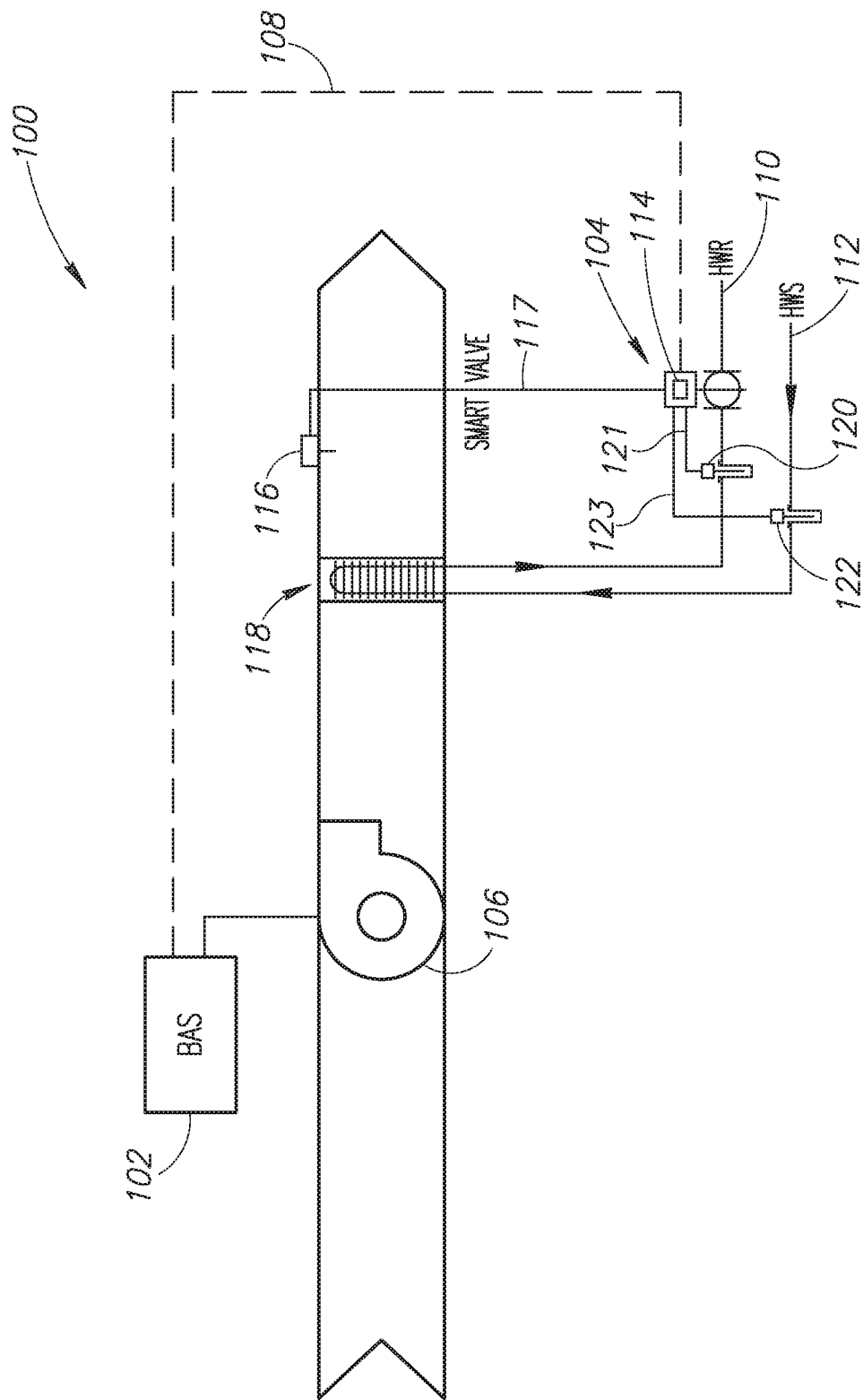
FIG. 3 is a schematic system diagram of an air handling unit (AHU) without a building automation system (BAS) directly controlling a smart valve and wherein the smart valve processes information from an air temperature sensor and at least one water temperature sensor according to an embodiment of the present invention.

FIG. 3 shows a single coil AHU system 100 having a BAS 102 that does not directly control a smart valve 104 according to an embodiment of the present invention. As discussed above, conventional AHU systems require a separate controller (e.g., the BAS or other unit controller) to modulate the valve position when maintaining a desired air stream temperature leaving the coil. In the illustrated embodiment, the single coil AHU system 100 includes a fan or blower 106 in signal communication with the BAS 102, a water return line 110, and a water supply line 112. The phrase "single coil" refers to a simple AHU system that incorporates only a heating or a cooling coil 118, but not both. The smart valve 104 includes a processor 114 that receives information from an air temperature sensor 116 in the air stream downstream of the coil 118. The smart valve 104 also receives information from a water return (WR) temperature sensor 120 and may also receive information from a water supply (WS) temperature sensor 122. The WR and WS temperature sensors 120, 122 operate to provide water temperature values to the smart valve 104, and in turn the smart valve 104 determines a temperature differential between the supply and return lines 110, 112. The processor 114 is programmable to receive the information, independent of the BAS 102, and determine a valve position (e.g., percentage (%) open) of the smart valve 104.

Controlling the valve position independent of the BAS 102 eliminates the need for the programmer to adjust or tune the control logic in the BAS 102 that would have otherwise controlled the valve position of the smart valve 104. Instead, the control logic in the processor 114 of smart valve 104 automatically tunes the smart valve 104 to modulate its position based on the temperature sensor 116, 120, 122 values transmitted to the smart valve 104 through direct communication signals 117, 121, and 123, respectively, using advanced multi-variable control techniques. These multivariable temperature inputs 117, 121, 123 advantageously result in a more accurate, stable and reliable AHU supply air temperature control without requiring special programming within the BAS 102. In one embodiment of the AHU system 100, the BAS 102 may be in one-directional or bi-directional communication with the smart valve 104 as illustrated by the dashed line 108. Regardless of the communication between the BAS 102 and the smart valve 104, the smart valve 104 controls its own internal valve position, which in turn may advantageously eliminate or at least reduce modulation instabilities that may otherwise occur with direct BAS control of the smart valve 104.

Figure 4:
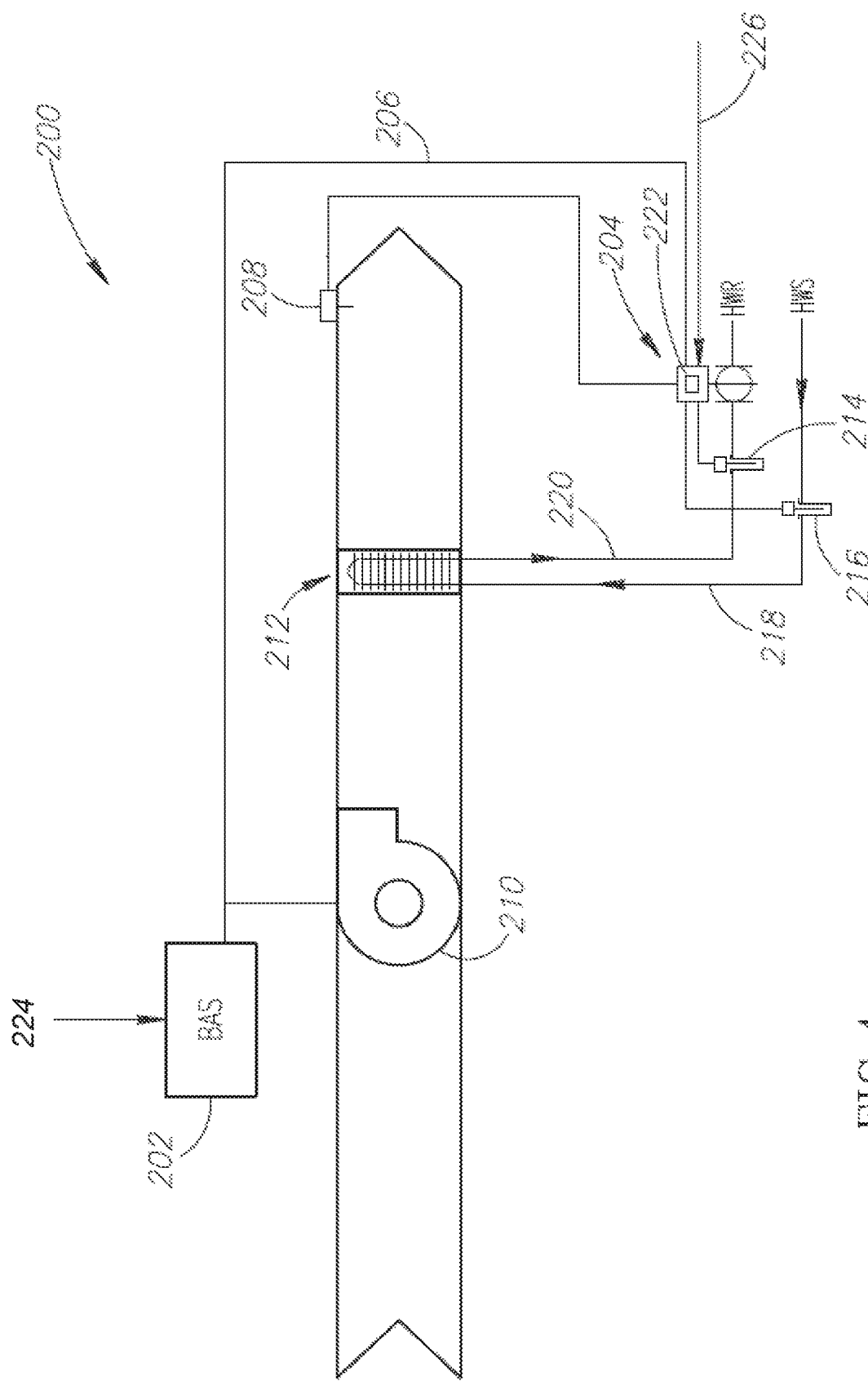
FIG. 4 is a schematic system drawing of an AHU with a building automation system that provides a temperature setpoint signal or value to a smart valve and wherein the smart valve information from an air temperature sensor and at least one water temperature sensor according to an embodiment of the present invention.

FIG. 4 shows a single coil AHU system 200 having a BAS 202 that strategically controls a smart valve 204 using an air temperature setpoint control signal 206 according to an embodiment of the present invention. The temperature setpoint control signal 206 may take the form of a desired temperature or temperature objective, for example the temperature setpoint signal 206 may be an air supply temperature desired to be achieved at an air temperature sensor 208 downstream of a fan 210 and a coil 212 or a temperature desired to be achieved in a room or space (not shown) that is being heated or cooled by the AHU system 200. The temperature setpoint signal 206, as compared to the position command signal 44 described above with respect to FIG. 1, allows the operator to establish a temperature setpoint in the BAS 202 or for the setpoint to be automatically calculated based on certain conditions instead of programming the logic for a PI or PID loop control of the valve position.

In one embodiment, the air temperature setpoint 206 may be established using a fixed value set by the operator. Alternatively, the air temperature setpoint 206 may be automatically adjusted by the BAS 202 such that in cold weather it is higher and in warmer weather is set cooler by an algorithm based on the current, outside air temperature, an average of the outside temperatures over a predetermined amount of time, or some other function that employs the outside air temperature and/or a temperature of the space being conditioned by the AHU 200. The smart valve 204 also receives information from a water return (WR) temperature sensor 214 and may also receive information from a water supply (WS) temperature sensor 216. The WR and WS temperature sensors 214, 216 operate to provide water temperature values to the smart valve 204, and in turn the smart valve 204 determines a temperature differential between the supply and return lines 218, 220, respectively. A processor 222 in the smart valve 204 is programmable to process the air temperature information, the setpoint information, and the water temperature values independent of the BAS 202, and determine a valve position (e.g., percentage (%) open) of the smart valve 204.

Once the BAS 202 provides the temperature setpoint signal 206 to the smart valve 204, the processor 222 in the smart valve 204 will use that temperature setpoint signal 206 to adjust the valve position without additional input from the BAS 202 or at least until the BAS 202 determines that it is necessary to update the temperature setpoint signal 206. In another embodiment, a monitoring entity in networked communication with the BAS 202 may update the temperature setpoint signal 224 to the BAS 202 from a remote location. By way of example, the BAS system 202 may receive the updated temperature setpoint signal 224 pursuant to a desired communication protocol over an internet connection, a wireless connection or another type of data transfer communication platform. Alternatively, an updated temperature setpoint signal 226 may be transmitted directly to the smart valve 204 without use of the BAS 202.

Figure 5:
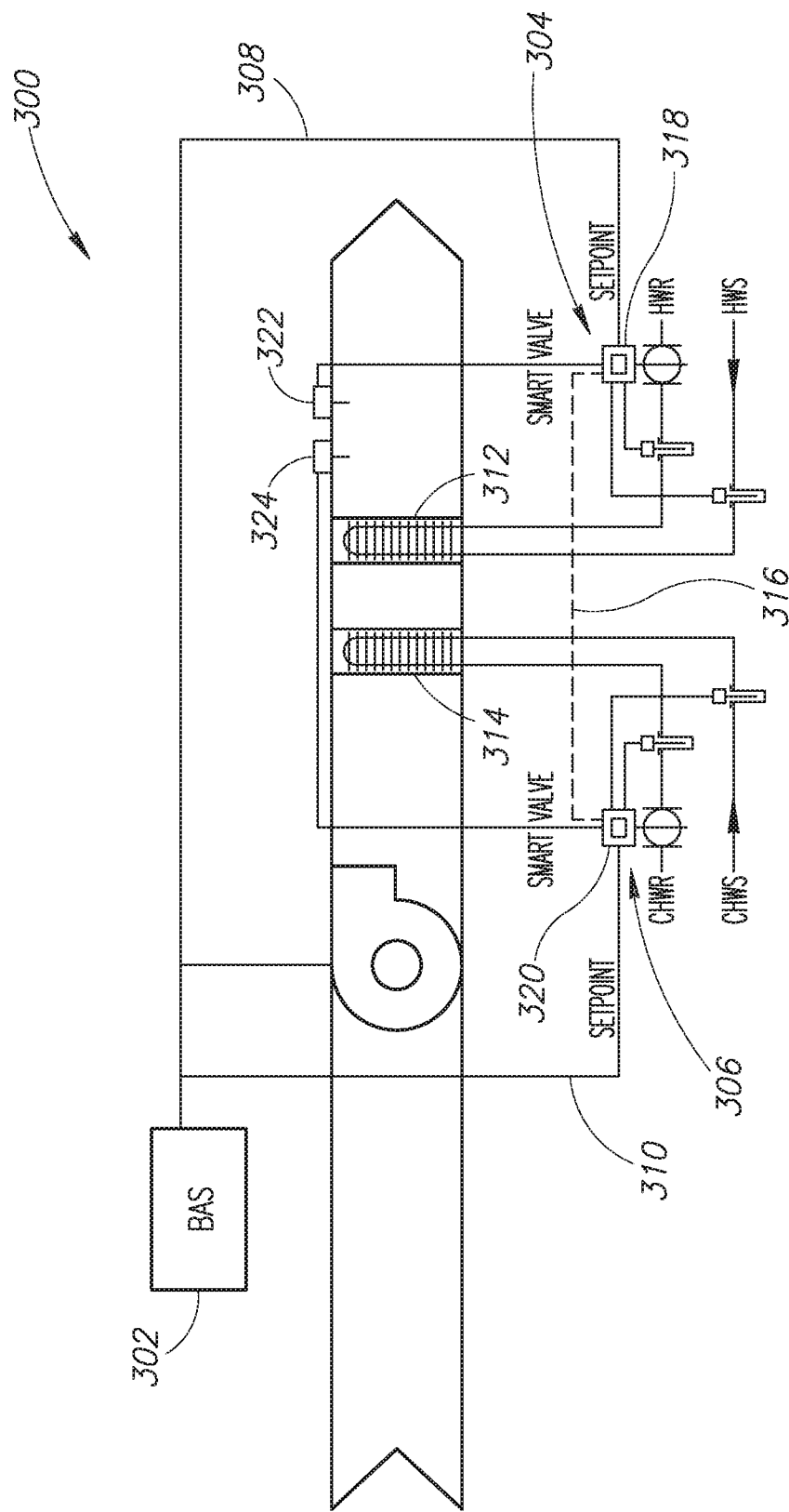
FIG. 5 is a schematic system drawing of an AHU with a building automation system that provides a temperature setpoint signal or value to at least two smart valves and wherein the smart valves process information from an air temperature sensors and water temperature sensors according to an embodiment of the present invention.

FIG. 5 shows a multi-coil AHU system 300 having a BAS 302 that strategically controls two or more smart valves 304, 306 using separate temperature setpoint control signals 308, 310 according to an embodiment of the present invention. Functionally, the multi-coil AHU system operates like the above-described embodiment of FIG. 4 except that smart valve 304 may control a heating coil 312 while the other smart valve 306 may control a cooling coil 314. As such, each smart valve 304, 306 may receive different temperature setpoint control signals 308, 310 at the same time or contemporaneously in time. In addition, a communication line 316 between the valves 304, 306 allows processors 318, 320 within the valves 304, 306 to cooperate together for heating, cooling, or maintaining the desired air temperature setpoint without applying simultaneous heating and cooling and without rapid changes from heating to cooling. In addition, the coordinated cooperation enables each smart valve 304, 306 to independently and continuously evaluate downstream air temperature as measured by two air temperature sensors 322, 324. In the illustrated embodiment, the air temperature sensor 322 is in direct, electronic communication with the smart valve 304 while the air temperature sensor 324 is in direct, electronic communication with the smart valve 306. The air temperature sensors can be placed in the airstream directly after their respective coils or both together in common airstream after both the coils 314,312, there are advantages inherent with either method of placement.

Figure 6:
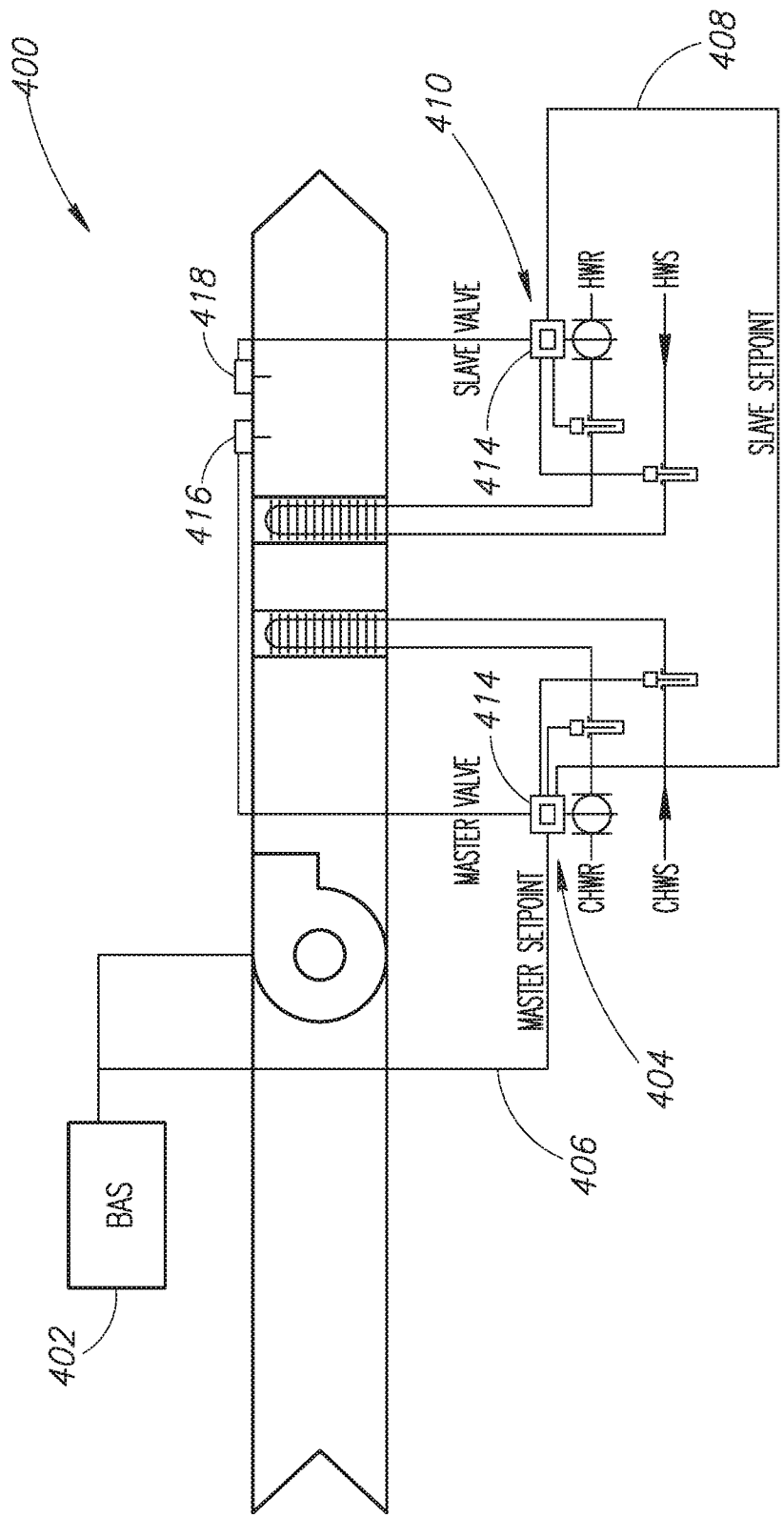
FIG. 6 is a schematic system drawing of an AHU with a building automation system that provides a temperature setpoint signal or value to at master smart valve that is programmed to control a second smart valve with a slave temperature setpoint signal or value according to an embodiment of the present invention.

FIG. 6 shows a multi-coil AHU system 400 for heating and cooling operations in which a BAS 402 communicates solely with a first smart valve 404 by transmitting a master temperature setpoint signal 406 thereto. The first smart valve 404, in turn, transmits a slave temperature setpoint signal 408 to a second smart valve 410. Thus, the AHU system 400 involves networking two smart valves 404, 410 together in a master/slave relationship. It is advantageous for the valves 404, 410 to know that they are both in the same AHU system 400, which may be accomplished by setting them up accordingly and denoting which controls heating and which controls cooling. The configuration of the illustrated AHU system 400 may advantageously save time and computing resources since the BAS 402 does not have to provide separate signals to the valves 404, 410, but instead only needs to provide one signal to the master valve 404. Processors 414 within the valves 404, 410 cooperate to ensure the proper heating or cooling is applied to maintain a desired air temperature setpoint without applying simultaneous heating and cooling and without rapid changes from heating to cooling. In addition, the coordinated cooperation enables each smart valve 404, 410 to independently and continuously evaluate downstream air temperatures as measured by two air temperature sensors 416, 418. In the illustrated embodiment, the air temperature sensors 416, 418 are in direct, electronic communication with the smart valves 404, 410, respectively. The air temperature sensors can be placed in the airstream directly after their respective coils or both together in common airstream after both the coils 314,312, there are advantages inherent with either method of placement.

Figure 7:
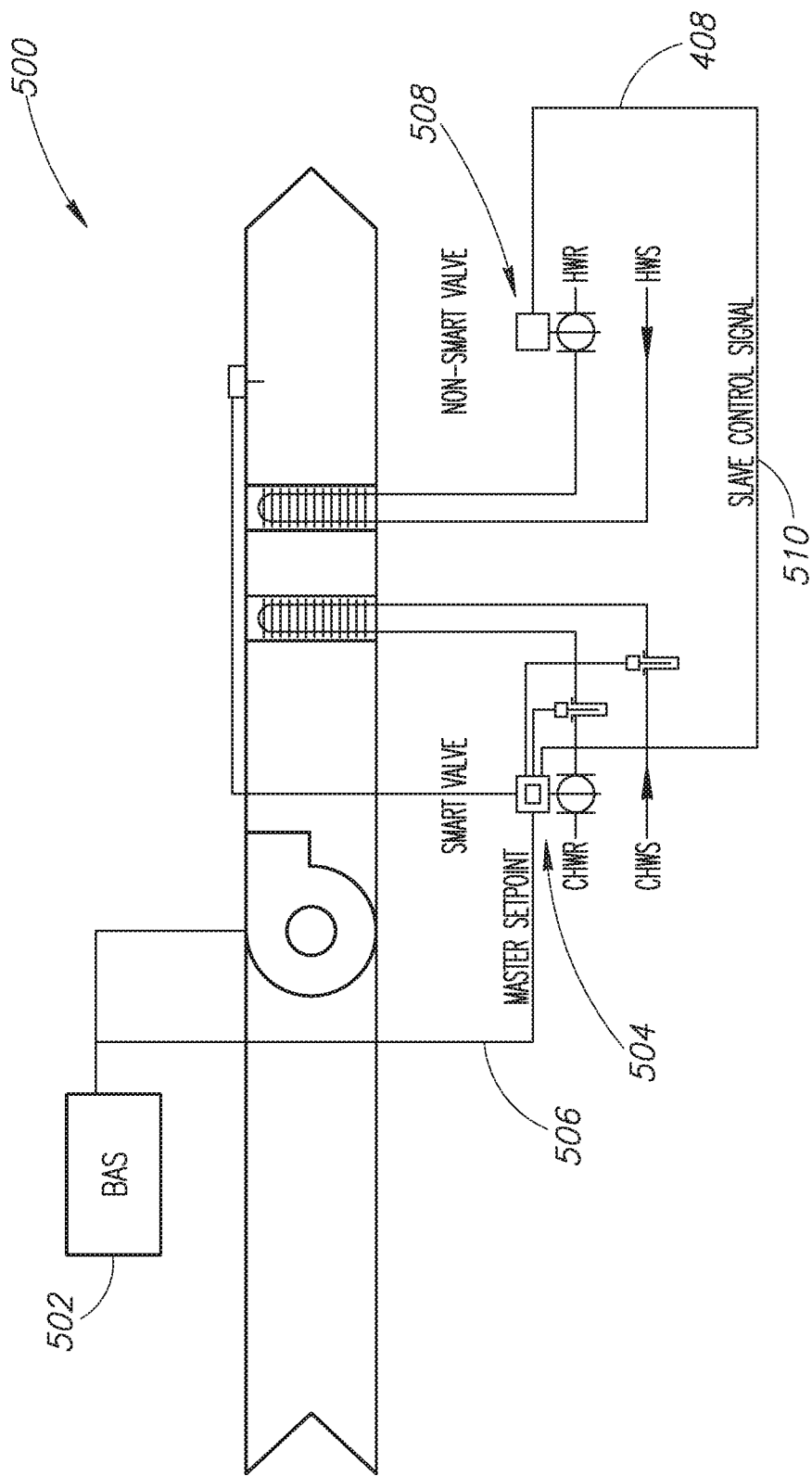
FIG. 7 is a schematic system drawing of an AHU with a building automation system that provides a temperature setpoint signal or value to at master smart valve that is programmed to control a second non-smart valve with a slave temperature setpoint signal or value or with a valve position signal or value according to an embodiment of the present invention.

FIG. 7 shows a multi-coil AHU system 500 for heating and cooling operations in which a BAS 502 communicates solely with a master smart valve 504 (master valve) by transmitting a master temperature setpoint signal 506 while the master valve 504 controls an operation of a non-smart valve 508, which in turn transmits a slave control signal 510 that may take the form of a command position signal. Utilizing a non-smart valve 508 in the AHU system 500 may reduce an overall cost of the AHU system 500 while simultaneously saving time and computing resources since the BAS 502 does not have to provide separate signals to the valves 504, 508, but instead may control only the master valve 504, which then controls the slave valve 508.

In operation, the multivariable control of the smart valve may include comparing a downstream air temperature with a setpoint value (e.g., setpoint air temperature) to modulate the smart valve, which may include, but is not limited to, setting a current position of the smart valve, controlling a temperature of the fluid leaving the coil, and controlling a temperature of the fluid entering the coil, when available. In the operation of various embodiments described herein, the temperature of the fluid leaving the coil at full capacity is programmed into the smart valve. When used, the temperature of the fluid entering the coil is also programmed into the smart valve. Further, the temperature of the air leaving the coil at full capacity (also commonly referred to as a "design condition" is also programmed into the smart valve as part of the setup regiment. Using these realtime, and recently collected values and this pre-programmed data, the smart valve processor may accurately estimate what change in capacity of the coil will occur from a specific incremental change in valve position. In addition, the smart valve can estimate what change in supply air temperature will occur from such a specific incremental change in valve position. This information allows the smart valve logic to provide near-optimal and rapid valve positioning responses for changing downstream air temperatures that may deviate from the setpoint air temperature while eliminating any latency or lag from direct control by the BAS. Consequently, aspects of the embodiments of the present invention described herein, however combined, may substantially improve both the accuracy and stability of air temperature control for an AHU system.

While the preferred embodiment of the invention has been illustrated and described, as noted above, many changes can be made without departing from the spirit and scope of the invention. In addition, other advantages will also be apparent to those of skill in the art with respect to any of the above-described embodiments whether viewed individually or in some combination thereof. Accordingly, the scope of the invention is not limited by the disclosure of the preferred embodiment. Instead, the invention should be determined entirely by reference to the claims that follow.

What is claimed is:

1. A method for controlling an air handler unit, the method comprising:
  providing a temperature setpoint to a smart valve in fluid communication with at least one coil of the air handler unit;
  providing to the smart valve an air temperature of air conditioned by the air handler unit; and
  modulating a valve position of the smart valve using the temperature setpoint, and the air temperature.

2. The method of claim 1, wherein the method further comprises providing to the smart valve a water temperature of water flowing into or out of the coil; and modu-lating the valve position of the smart valve using the temperature setpoint, the air temperature, and the water temperature.

3. The method of claim 1, further comprising modulating the valve position of the smart valve by maintaining a minimum temperature difference between a supply flow and a return flow of the water flowing into or out of the coil.

4. The method of claim 1, wherein providing the temperature setpoint to a smart valve includes electronically transmitting the temperature setpoint from an automa-tion system to the smart valve.

5. The method of claim 1, wherein providing the temperature setpoint to the smart valve includes providing the temperature setpoint to the smart valve from a remote location.

6. The method of claim 1, further comprising determining a measured temperature differential between a water supply line and a water return line of the coil.

7. The method of claim 1, wherein providing an air temperature to the smart valve includes providing the air temperature from the air flow located within the air han-dler unit, and wherein the air temperature sensor is located in the air flow down-stream of the coil relative to an air flow direction of the air flow.

8. The method of claim 1, further comprising determining a temperature differential of the water temperature flowing into or out of the coil.

9. The method of claim 1, further comprising determining the temperature setpoint based on a desired temperature for a space served by the air handler unit.

10. The method of claim 1, further comprising determin-ing the temperature setpoint based on an outside air temperature.

* * * * *